United States Patent
Yi et al.

(10) Patent No.: US 12,359,839 B2
(45) Date of Patent: Jul. 15, 2025

(54) CONTROL CIRCUIT FOR AIR CONDITIONER OUTDOOR UNIT, ELECTRIC CONTROL COMPONENT AND AIR CONDITIONER

(71) Applicants: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

(72) Inventors: Wenjie Yi, Guangdong (CN); Wenkai Zhang, Guangdong (CN); Gucheng Deng, Guangdong (CN); Weibin Lu, Guangdong (CN)

(73) Assignees: FOSHAN SHUNDE MIDEA ELECTRIC SCIENCE AND TECHNOLOGY CO., LTD., Guangdong (CN); GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 22 days.

(21) Appl. No.: 18/203,959

(22) Filed: May 31, 2023

(65) Prior Publication Data
US 2023/0332799 A1     Oct. 19, 2023

Related U.S. Application Data

(63) Continuation of application No. PCT/CN2021/102398, filed on Jun. 25, 2021.

(30) Foreign Application Priority Data

Dec. 31, 2020  (CN) .......................... 202011644550

(51) Int. Cl.
*F24F 11/88*        (2018.01)
*F24F 11/89*        (2018.01)

(52) U.S. Cl.
CPC .............. *F24F 11/89* (2018.01); *F24F 11/88* (2018.01)

(58) Field of Classification Search
CPC .. F24F 11/46; F24F 11/63; F24F 11/65; F24F 11/70; F24F 2140/60; F24F 11/30;
(Continued)

(56) References Cited

U.S. PATENT DOCUMENTS 11,971,180 B2 *   4/2024   Zhang ....................... F24F 1/20

FOREIGN PATENT DOCUMENTS

CN       104315672 A       1/2015
CN       104896687 A       9/2015
(Continued)

OTHER PUBLICATIONS

International Search Report and Written opinion dated Sep. 27, 2021 received in International Application No. PCT/CN2021/102398.
(Continued)

*Primary Examiner* — Elim Ortiz
(74) *Attorney, Agent, or Firm* — Scully, Scott, Murphy & Presser, P.C.

(57) ABSTRACT

A control circuit for an air conditioner outdoor unit, an electric control component and an air conditioner are provided. The control circuit has a power input end for accessing alternating current power, an outdoor unit power supply circuit connected to the power input end for converting the accessed alternating current into an outdoor unit power supply, a first electronic switch provided in series between the power input end and the outdoor unit power supply circuit, and a standby power supply. An input end of the
(Continued)

standby power supply is connected to an output end of a standby control power supply of an indoor unit. An output end of the standby power supply is connected to a controlled end of the first electronic switch. The standby power supply starts to operate when receiving the standby control power supply of the indoor unit, to control the closing of the first electronic switch.

11 Claims, 3 Drawing Sheets

(58) Field of Classification Search
CPC .......... F24F 11/88; F24F 1/22; H02M 1/0032; H02M 1/009; H02M 3/33561; H02M 7/48; Y02B 70/10; Y02B 30/70; F25B 13/00; F25B 2600/021; F25B 49/02; F25B 2500/19
USPC ....... 307/66, 64, 80; 713/320; 323/282, 271, 323/222, 17, 89; 700/276; 363/97, 89, 363/17, 21.01
See application file for complete search history.

(56) References Cited

FOREIGN PATENT DOCUMENTS

| | | | |
|---|---|---|---|
| CN | 105066385 | A | 11/2015 |
| CN | 105135594 | A | 12/2015 |
| CN | 107449034 | A | 12/2017 |
| CN | 108119994 | A | 6/2018 |
| CN | 109764503 | A | 5/2019 |
| CN | 111656104 | A | 9/2020 |
| CN | 111928427 | A * | 11/2020 |
| CN | 112762525 | A | 5/2021 |
| EP | 3382879 | A1 | 10/2018 |

OTHER PUBLICATIONS

First Office Action dated Jan. 5, 2022 received in Chinese Patent Application No. CN 202011644550.9.
Second Office Action dated Oct. 10, 2022 received in Chinese Patent Application No. CN 202011644550.9.
Third Office Action dated Apr. 29, 2023 received in Chinese Patent Application No. CN 202011644550.9.
Fan, L., "Mechanical and Electrical Control Technology", Electrical control technology, Jan. 1, 2014, pp. 62-63.

* cited by examiner

CONTROL CIRCUIT FOR AIR CONDITIONER OUTDOOR UNIT, ELECTRIC CONTROL COMPONENT AND AIR CONDITIONER

CROSS-REFERENCE TO RELATED APPLICATIONS

This application is continuation application of PCT International Patent Application No. PCT/CN2021/102398, filed on Jun. 25, 2021, which claims priority to and benefits of Chinese Patent Application No. 202011644550.9, filed on Dec. 31, 2020, the entire contents of each of which are incorporated herein by reference for all purposes. No new matter has been introduced.

FIELD

The present disclosure relates to the field of electric control, and in particular, to a control circuit for an air conditioner outdoor unit, an electric control component and an air conditioner.

BACKGROUND

With the advancement of science and technology, people have higher requirements for air conditioners. They not only pay attention to whether the air conditioner can cool and heat, but also pay more attention to whether the air conditioner can save energy and reduce consumption. That is, energy saving is one of the criteria for measuring the performance of home appliances. As a high-power electrical appliance, the air conditioner is a household appliance that consumes a substantial amount of energy. Therefore, how to reduce the energy consumption of air conditioners and achieve energy conservation and environmental protection has become a hot spot in the research of air conditioner manufacturers and the attention of users. However, under the constraints of the air conditioner's own structure, it is becoming more difficult to reduce power consumption.

SUMMARY

The main purpose of the present disclosure is to provide a control circuit for an air conditioner outdoor unit, an electric control component and an air conditioner, at least aiming at reducing power consumption due to standby and meeting low energy consumption requirements.

In order to achieve the above purpose, the present disclosure provides a control circuit for an air conditioner outdoor unit, including:
  a power input end for accessing alternating current (AC) power;
  an outdoor unit power supply circuit connected to the power input end, and for converting the accessed alternating current into an outdoor unit power supply;
  a first electronic switch provided in series between the power input end and the outdoor unit power supply circuit; and
  a standby power supply, wherein an input end of the standby power supply is connected to an output end of a standby control power supply of an indoor unit, an output end of the standby power supply is connected to a controlled end of the first electronic switch, and the standby power supply starts to operate when receiving the standby control power supply of the indoor unit, to control the closing of the first electronic switch.

In an embodiment, the first electronic switch is a first relay, a first end of a first relay coil is connected to a ground end of the standby power supply, a second end of the first relay coil is the controlled end of the first electronic switch, a static contact of the first relay is connected to the power input end, and a movable contact of the first relay is connected to an input end of the outdoor unit power supply circuit.

In an embodiment, the standby power supply is a non-isolated switching power supply, an input end of the non-isolated switching power supply is an input end of the standby power supply, an output end of the non-isolated switching power supply is an output end of the standby power supply, and the non-isolated switching power supply is configured to convert the standby control power supply of the indoor unit into direct current (DC) voltage, to power on and actuate the first relay.

In an embodiment, the control circuit for the air conditioner outdoor unit further includes:
  a second electronic switch provided in series between the power input end and the input end of the outdoor unit power supply circuit; and
  a current-limiting element provided in series between the first electronic switch and the power input end of the outdoor unit power supply circuit.

In an embodiment, the control circuit for the air conditioner outdoor unit further includes an outdoor unit main controller,
  a control signal input end of the outdoor unit main controller is in communication with an indoor unit main controller, an output end of the outdoor unit main controller is connected to a controlled end of the second electronic switch, and the outdoor unit main controller is configured to control the closing of the second electronic switch when receiving a power-on control signal.

In an embodiment, the outdoor unit power supply circuit includes a rectifier bridge circuit, a PFC circuit and an IPM module sequentially connected to the power input end, and a controlled end of the PFC circuit and a controlled end of the IPM module are respectively connected to the main controller.

In an embodiment, the control circuit for the air conditioner outdoor unit has a first application mode and a second application mode;
  under the first application mode, the first electronic switch is electrically connected to the current-limiting element; and
  under the second application mode, the control circuit for the air conditioner outdoor unit further includes a short circuit device electrically connected to the current-limiting element.

The present disclosure further provides an electric control component, including: an electric control board of an indoor unit; an electric control board of an outdoor unit; an electrical connector; and the control circuit for the air conditioner outdoor unit as described above.

The control circuit for the air conditioner outdoor unit and the electrical connector are provided on the electric control board of the outdoor unit.

The electrical connector is configured for connecting the electric control board of the indoor unit and the electric control board of the outdoor unit.

In an embodiment, the electric control board of the indoor unit is provided with an indoor unit main controller;

the indoor unit main controller is in communication with the main controller of the control circuit for the air conditioner outdoor unit;

the indoor unit main controller is configured to communicate with an outdoor unit main controller of the control circuit for the air conditioner outdoor unit in response to receiving a power-on control signal to control the closing of the second electronic switch of the control circuit for the air conditioner outdoor unit; and output the standby control power supply to the standby power supply of the control circuit for the air conditioner outdoor unit in response to receiving a wake-up control signal to control the closing of the first electronic switch of the control circuit for the air conditioner outdoor unit.

The present disclosure further provides an air conditioner, including the control circuit for the air conditioner outdoor unit as described above; or the electric control component as described above.

The present disclosure provides a control circuit for an air conditioner outdoor unit. The standby power supply is provided in the control circuit for the air conditioner outdoor unit. An input end of the standby power supply is connected to an output end of a standby control power supply of an indoor unit, an output end of the standby power supply is connected to a controlled end of the first electronic switch, and the standby power supply starts to operate when receiving the standby control power supply of the indoor unit, to control the closing of the first electronic switch arranged in series between the power supply input end and the outdoor unit power supply circuit. When the first electronic switch is closed, the power input end can be communicated with the outdoor unit power supply circuit, so that the outdoor unit power supply circuit converts the accessed AC power into the outdoor unit power supply to supply power for the outdoor unit. It can be understood that when the indoor unit outputs power, the standby power supply operates and provides driving power for the first electronic switch. When the indoor unit stops outputting power, the standby power supply stops operating. At this time, the first electronic switch is turned off because the standby power supply stops supplying power, thereby powering down the outdoor unit and stopping operation of the outdoor unit. Since the power supply between the outdoor unit and the indoor unit is disconnected, the outdoor unit will not be powered on at this time, so that OW standby can be realized when the outdoor unit is in standby. The present disclosure is beneficial to reducing the standby power consumption of the air conditioner and meeting the requirement of low energy consumption.

BRIEF DESCRIPTION OF THE DRAWINGS

In order to more clearly illustrate the technical solutions in the embodiment of the present disclosure or in the prior art, the following will briefly introduce the drawings that need to be used in the description of the embodiment or the prior art. Obviously, the accompanying drawings in the following description are only some embodiments of the present disclosure. For those skilled in the art, other drawings can also be obtained according to the structures shown in these drawings without any creative effort.

Figure 1:
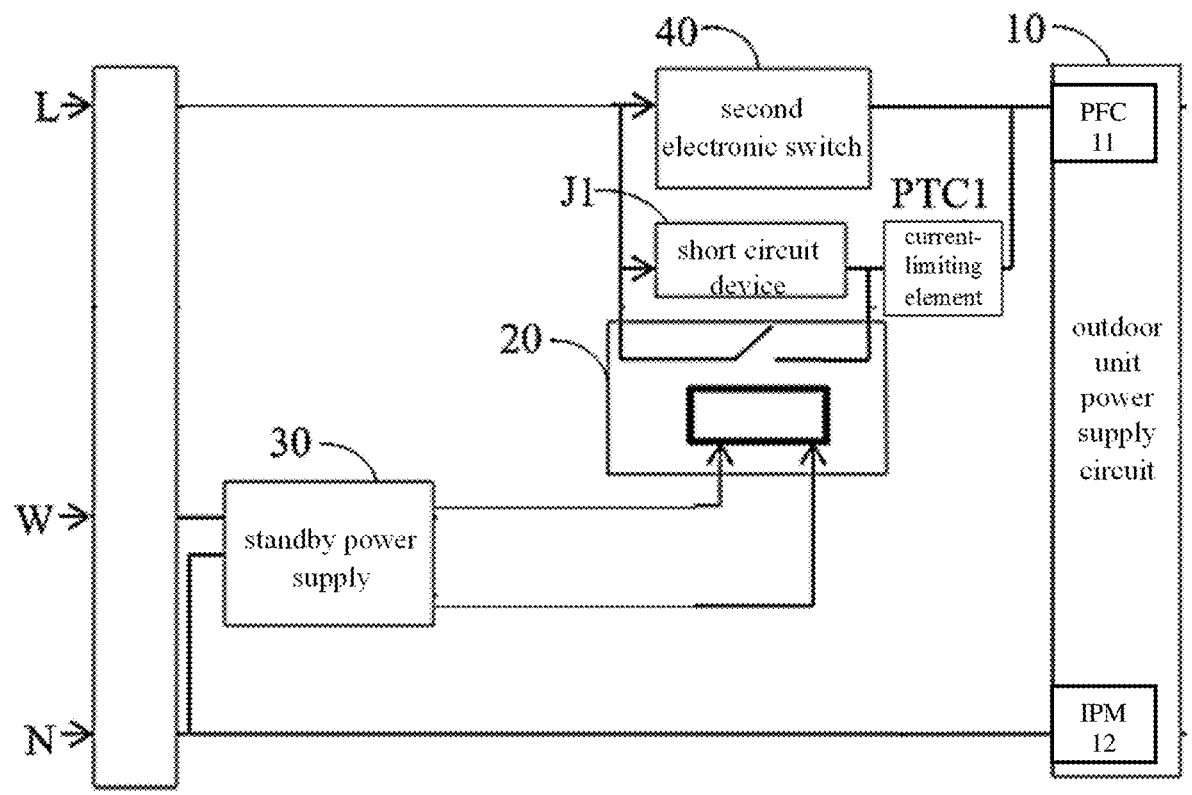
FIG. 1 is a schematic diagram of functional modules of a control circuit for an air conditioner outdoor unit according to an embodiment of the present disclosure.

Description of reference signs.

| Reference sign | Name |
| --- | --- |
| 10 | outdoor unit power supply circuit |
| 20 | first electronic switch |
| 30 | standby power supply |
| 40 | second electronic switch |
| PTC1 | current-limiting element |
| J1, J2 | short circuit device |

The realization, functional features and advantages of the present disclosure will be further described in conjunction with the embodiments and with reference to the accompanying drawings.

DETAILED DESCRIPTION OF EMBODIMENTS

The technical solutions in the embodiments of the present disclosure will be clearly and completely described below in conjunction with the accompanying drawings. Apparently, the described embodiments are only some embodiments of the present disclosure, rather than all the embodiments. Based on the embodiments in the present disclosure, all other embodiments obtained by persons of ordinary skill in the art without creative efforts fall within the scope of the present disclosure.

The present disclosure provides a control circuit for an air conditioner outdoor unit, applied to an air conditioner outdoor unit. The air conditioner may be an air conditioner with an outdoor unit such as an on-hook unit, a cabinet unit, or a central air conditioner.

Both the air conditioner indoor unit and the air conditioner outdoor unit are provided with electric control boards, that is, an electric control board of an outdoor unit and an electric control board of an indoor unit. A power plug is provided on the electric control board of the indoor unit, and the power plug is connected to the electric control board of the indoor unit for accessing an alternating current (AC) power, such as a commercial power supply. The electric control board of the indoor unit is configured to control the air conditioner indoor unit to operate, and the electric control board of the outdoor unit is configured to control the air conditioner outdoor unit to operate. It should be noted that the electric control board of the outdoor unit can be accessed to the power supply from the electric control board of the indoor unit through the power cord, that is, the indoor unit usually supplies power to the outdoor unit, the air conditioner is in standby mode most of the time, and the standby power consumption is relatively high. If the low power consumption standby design is implemented for the air conditioner, the indoor unit is usually configured to cut off the power of the outdoor unit, so that the outdoor unit is completely powered off, thereby reducing the standby power consumption of the outdoor unit. Generally, the outdoor unit main controller and a relay for controlling the outdoor unit power supply are usually provided on the electric control board of the outdoor unit. The outdoor unit main controller communicates with the indoor unit main controller. The outdoor unit main controller determines whether to access the power supply of the indoor unit according to the control signal output by the indoor unit main controller. When the air conditioner is in the long-term standby state, the outdoor unit main controller controls the relay to turn off to cut off the power supply of the outdoor unit to reduce the standby power consumption of the air conditioner. When the air conditioner is turned on or the standby is finished, the outdoor unit main controller controls to actuate the relay to supply power to the outdoor unit, so as to reduce the standby power consumption of the air conditioner. It can be seen that if the outdoor unit main controller is configured to control the on-off of the relay, it is necessary to supply power to the outdoor unit main controller during the standby process of the air conditioner. This makes the power supply circuit of the outdoor unit main controller (for example, the switching power supply) still in a charged operating state, which will cause the air conditioner's failure to meet the low energy consumption requirements due to its high standby power.

The air conditioner can also be powered by the outdoor unit, and the loads in the indoor unit (such as indoor fans, stepping motors, etc.) are all powered by the outdoor unit. The electric control board of the indoor unit is provided with the indoor unit main controller, and the indoor unit main controller is the main control part of the air conditioner. The loads of the indoor unit and the outdoor unit are controlled by the indoor unit main controller, and the control signal of the loads of the indoor unit is directly sent by the indoor unit main controller. However, the control signal of the loads of the outdoor unit (such as the electric control board of the outdoor unit, the compressor, the four-way valve, the outdoor fan) is sent by the indoor unit main controller to the outdoor unit controller through the current loop communication circuit, then the outdoor unit main controller controls the operation of the load of the outdoor unit according to the control signal. Thus, if the air conditioner is powered by the outdoor unit, when the whole unit is in the standby state, the load in the outdoor unit is still in a charged operating state. Therefore, the air conditioner cannot meet the requirement of low energy consumption due to high standby power.

Figure 2:
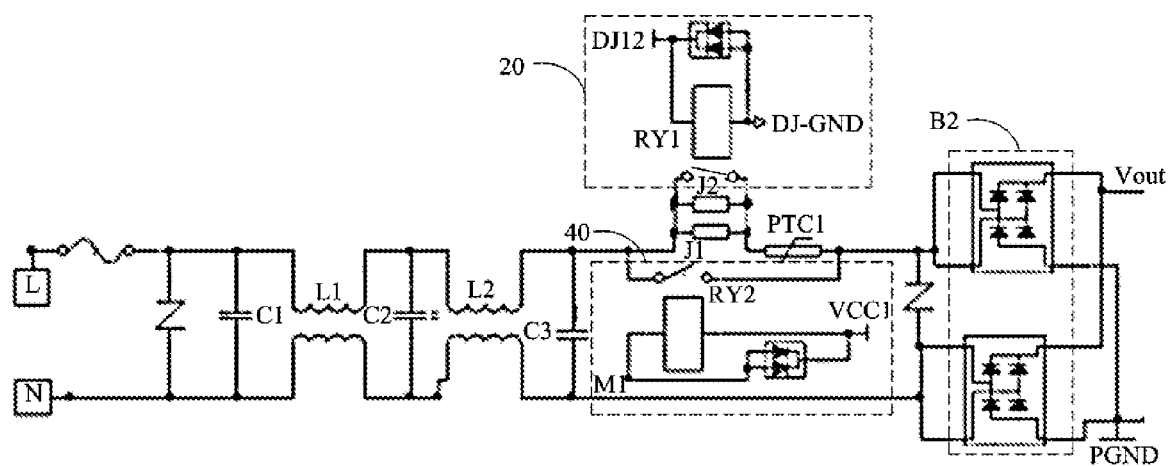
FIG. 2 is a schematic diagram of a circuit structure of a control circuit for an air conditioner outdoor unit according to an embodiment of the present disclosure.
Figure 3:
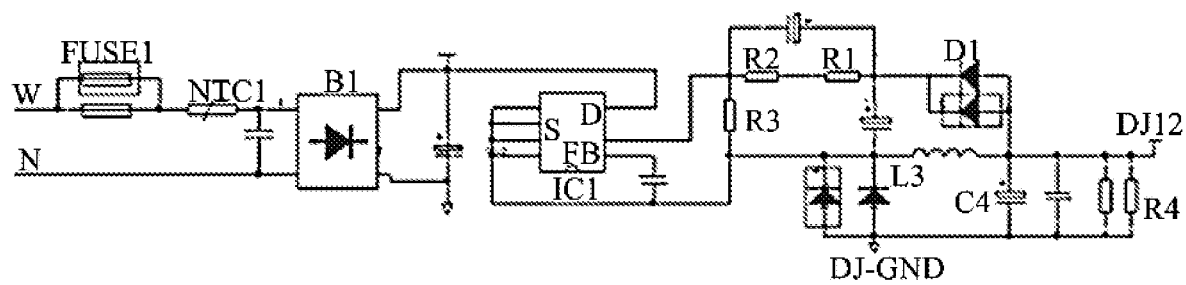
FIG. 3 is a schematic diagram of a circuit structure of a standby power supply in FIG. 1.

As shown in FIG. 1 to FIG. 3, in order to solve at least the above problems, the present disclosure provides a new type of a control circuit for an air conditioner outdoor unit. In an embodiment of the present disclosure, the control circuit for the air conditioner outdoor unit includes power input ends L and N, an outdoor unit power supply circuit 10, a first electronic switch 20, and a standby power supply 30.

The power input ends L and N are for accessing alternating current (AC) power.

The outdoor unit power supply circuit 10 is connected to the power input ends L and N, for converting the accessed alternating current into an outdoor unit power supply.

The first electronic switch 20 is provided in series between the power input ends L and N and the outdoor unit power supply circuit 10.

An input end of the standby power supply 30 is connected to an output end of a standby control power supply of an indoor unit, an output end of the standby power supply 30 is connected to a controlled end of the first electronic switch 20, and the standby power supply 30 starts to operate when receiving the standby control power supply of the indoor unit, to control the closing of the first electronic switch 20.

In this embodiment, the power input ends L and N can be accessed to the AC power from the indoor unit, that is, the outdoor unit is powered through the indoor unit, or the AC power is accessed from the outside. Moreover, an AC power output end can also be set to provide AC power to the indoor unit, that is, to supply power to the indoor unit through the outdoor unit. In this embodiment, the outdoor unit can also be powered by the indoor unit.

The outdoor unit power supply circuit 10 can be realized by using components such as an isolation transformer, a switch tube, a PWM controller, a rectification filter circuit, or the like, to perform power processing for the AC power supply accessed to the power input ends L and N, e.g., 220V mains, such as rectification, filtering, inverter, etc., to convert into corresponding power supply voltage to supply power to compressors, fans, solenoid valves, four-way valves, etc. in the outdoor unit.

In the above embodiments, the power supply input ends L and N include a null line power supply end N and a live line power supply end L. Further, the outdoor unit power supply circuit 10 further includes a filter circuit, and the filter circuit is connected in parallel between the null line power supply end N and the live line power supply end L.

In this embodiment, the filter circuit includes capacitors C1, C2, C3 and inductors L1, L2. A first end of the inductor L1 is connected to the live line power supply end L, a second end of the inductor L1 is connected to the inductor L2, the capacitor C1 is connected in parallel between the null line power supply end N and the live line power supply end L, and the capacitor C2 is connected in parallel with the second end of the inductor L1. The second end of the inductor L2 is connected to the first input end of the outdoor unit power supply circuit 10, and the capacitor C2 is connected in parallel between the second end of the inductor L2 and the null line power supply end N. The capacitors C1 and C2 can be selected to accommodate larger electrolytic capacitors to absorb low-order harmonics and maintain voltage, and the capacitor C3 can be selected to accommodate smaller film capacitors to absorb high-order harmonics.

The power input ends L and N can be connected to the standby control power supply of the indoor unit through the power cord. The standby control power of the indoor unit may be the AC power accessed to the indoor unit. When it is necessary to output the standby power supply 30 to the outdoor unit, a relay is provided on the electric control board of the indoor unit, and the relay is connected between the AC power output end and the standby power supply 30. When the power supply of the air conditioner is cut off, or the outdoor unit needs to be on standby, for example, when both the indoor unit and the outdoor unit are on standby, or when the indoor unit is operating in sweeping mode, the outdoor unit does not work at this time. Therefore, the indoor unit main controller can control the relay to be disconnected, so that the standby power supply 30 is cut off from the power supply. When it is necessary for the outdoor unit to finish standby, the indoor unit main controller controls to actuate the relay, so that the standby power supply 30 is accessed to the power supply. The standby power supply 30 converts the AC connected to the indoor unit into the driving power of the first electronic switch 20, thereby driving the first electronic switch 20 to operate, so as to realize the on/off of the first electronic switch 20. Furthermore, controlling the on/off of the AC power output from the indoor unit to the outdoor unit power supply circuit 10 of the outdoor unit can realize that in the standby state of the outdoor unit, the whole outdoor unit is not charged, and the standby with zero power consumption can be realized. In this embodiment, the first electronic switch 20 is controlled by the standby power supply 30, and the standby power supply 30 operates under the awakening of the indoor unit main controller. When the outdoor unit is operating normally or shutting down, it does not work (powered off), so that the first electronic switch 20 is in the off state. Such a setting can meet the low power consumption requirements of the air conditioner, and reduce the power consumption of the low-power power supply, and further realize energy saving and emission reduction. The standby power supply 30 can be realized by using a switching power supply. In this embodiment, the standby power supply 30 can only provide the driving power for the first electronic switch 20 to control the outdoor unit from the standby state to the operating state. The standby power supply 30 can also provide power for other circuit modules on the electric control board of the outdoor unit, such as the outdoor unit main controller, so as to supply power for the outdoor unit when it is converted from the standby state to the operating state.

The present disclosure provides a control circuit for an air conditioner outdoor unit. The standby power supply 30 is provided in the control circuit for the air conditioner outdoor unit. An input end of the standby power supply 30 is connected to an output end of a standby control power supply of an indoor unit, an output end of the standby power supply 30 is connected to a controlled end of the first electronic switch 20, and the standby power supply 30 starts to operate when receiving the standby control power supply of the indoor unit, to control the closing of the first electronic switch 20 arranged in series between the power supply input ends L, N and the outdoor unit power supply circuit 10. When the first electronic switch 20 is closed, the power input ends L, N can be communicated with the outdoor unit power supply circuit 10, so that the outdoor unit power supply circuit 10 converts the accessed AC power into the outdoor unit power supply to supply power for the outdoor unit. It can be understood that when the indoor unit outputs power, the standby power supply 30 operates and provides driving power for the first electronic switch 20. When the indoor unit stops outputting power, the standby power supply 30 stops operating. At this time, the first electronic switch 20 is turned off because the standby power supply 30 stops supplying power, thereby powering down the outdoor unit and stopping operation of the outdoor unit power down. Since the power supply between the outdoor unit and the indoor unit is disconnected, the outdoor unit will not be powered on at this time, so that OW standby can be realized when the outdoor unit is in standby. The present disclosure is beneficial to reduce the standby power consumption of the air conditioner and meet the requirement of low energy consumption.

As shown in FIG. 1 to FIG. 3, in an embodiment, the first electronic switch 20 is a first relay RY1, a first end of a coil of the first relay RY1 is connected to a ground end of the standby power supply 30, a second end of a coil of the first relay RY1 is the controlled end of the first electronic switch 20, a static contact of the first relay RY1 is connected to the power input end L, N, and a movable contact of the first relay RY1 is connected to an input end of the outdoor unit power supply circuit 10.

In this embodiment, the first electronic switch 20 can be realized by a relay, a contactor or a circuit breaker, and this embodiment can be realized by a relay. One end of the coil of the first relay RY1 shares the ground with the standby power supply 30, and one end of the coil of the first relay RY1 is connected to the output end of the standby power supply 30. When the input end of the standby power supply 30 is accessed with the power supply, after the standby power supply 30 converts the accessed power supply into the drive power supply of the first relay RY1, it supplies power to the coil of the first relay RY1, thereby actuating the first relay RY1. When the first relay RY1 pulls in, the power input ends L and N output the AC power input by the indoor unit to the outdoor unit power supply circuit 10. The outdoor unit power supply circuit 10 converts the AC power accessed to the power input ends L and N, such as 220V mains power, for power processing, such as rectification, filtering, inverter, etc., into a corresponding power supply voltage, to supply power to compressors, fans, solenoid valves, four-way valves, etc. in the outdoor unit. The outdoor unit power supply circuit 10 can also supply power to the outdoor unit main controller, and the outdoor unit power supply circuit 10 can be provided with a switching power supply for supplying power to the outdoor unit main controller. When the first relay RY1 is closed, the power supply input ends L and N output AC power to the switching power supply of the outdoor unit power supply circuit 10 to convert the received AC power into the power supply for the outdoor unit main controller, so that the outdoor unit main controller is powered on to operate.

In this embodiment, the outdoor unit main controller can be powered by an isolated switching power supply. For example, it can be realized by using components such as an isolation transformer, a switch tube, a PWM controller, and a rectification and filtering circuit, to convert the AC power accessed to the power input ends L and N, such as 220V commercial power, into direct current (DC) and output the DC to the outdoor unit controller to provide the outdoor unit controller with an operating voltage. The operating voltage of the outdoor unit controller may be 10V to 18V, and in this embodiment, it may be 12V.

In the above embodiments, the first electronic switch 20 can be further realized by using a magnetic holding first relay RY1. After the indoor unit provides electric energy to the standby power supply 30 and subsequently powers on and actuates the first relay RY1, the magnetic force of the permanent magnet in the magnetic holding first relay RY1 keeps the moving contact and the static contact of the magnetic holding first relay RY1 in the state of contact, and there is no need to continue charging the coil assembly. That is, the indoor unit main controller can control the first relay RY1 in the indoor unit to be turned off through the communication between the outdoor unit main controller and the indoor unit main controller. Or, the indoor unit main controller can set a timer, and cut off the power supply of the standby power supply 30 after providing power to the standby power supply 30 for a preset time. Afterwards, the magnetic holding first relay RY1 does not need to consume electric energy, which reduces the operating power consumption of the air conditioner. At the same time, when the air conditioner is in standby, the outdoor unit is controlled to cut off the power supply through the magnetic holding first relay RY1, thereby reducing the standby power consumption of the air conditioner. When receiving the shutdown or standby instruction output by the remote control of the air conditioner, the outdoor unit main controller communicates with the indoor unit main controller. Thus, the indoor unit main controller controls the first relay RY1 in the indoor unit to be turned off, to cut off the power supply of the outdoor unit, and stop the power supply to the outdoor unit, and the outdoor unit is controlled to stop operating, so that when the air conditioner is in standby, the standby power consumption of the air conditioner can be reduced.

As shown in FIG. 1 to FIG. 3, in an embodiment, the standby power supply 30 is a non-isolated switching power supply, an input end of the non-isolated switching power supply is an input end of the standby power supply 30, an output end of the non-isolated switching power supply is an output end of the standby power supply, and the non-isolated switching power supply is configured to convert the standby control power supply of the indoor unit into DC voltage, to power on and actuate the first relay RY1.

In this embodiment, the non-isolated switching power supply can be realized by an EMI filter capacitor, a filter inductor, a rectifier bridge B1, a step-down chip, an output inductor and an output capacitor, etc. After the accessed AC power, such as 220V mains power, is rectified, filtered and depressurized, it is converted into the power supply for the first electronic switch 20 and other circuit modules. In this embodiment, the power supply 130 may be 12V or 24V. Further, in the above embodiments, the standby power supply 30 includes a rectifier circuit (such as a rectifier bridge B1, a DC-DC circuit), a switching power supply IC1, a power filter circuit, a feedback circuit, etc. The input end of the rectifier bridge B1 is connected to the output end of the standby control power supply of the indoor unit, and the output end of the rectifier bridge B1 is connected to the switching power supply IC1 The output end of the switching power supply IC1 is connected to the controlled end of the first electronic switch 20 via the power filter circuit. The detection end of the feedback circuit is connected to the output end of the power filter circuit, and the output end of the feedback circuit is connected to the switching power supply IC1 The feedback circuit includes resistors R1, R2, R3 and a diode D1, the diode D1 is connected in series with the resistors R1, R2, R3, and the common end of R2, R3 is the output end of the feedback circuit. The power filter circuit includes an inductor L3, a resistor R4 and a capacitor C4, one end of the inductor is connected to the output end of the switching power supply IC1, and the capacitor and the resistor are connected in parallel to the other end of the inductor L3. The standby power supply 30 is also provided with an NTC resistor NTC1, a fuse FUSE1, and a Zener diode D2. The fuse FUSE1 and the NTC resistor NTC1 are connected in series between the output end of the standby control power supply and the rectifier bridge B1, and the Zener diode D2 is connected in series between the inductor L3 and the ground. The non-isolated switching power supply can provide corresponding power supply for the first electronic switch 20 (such as a relay). For example, when a relay is adopted, it can be a 12V power supply to control the pull-in of the relay to realize the low-power standby of the air-conditioning system. In the above embodiments, the input end W of the standby power supply 30 can be electrically connected with the strong electric output end of the indoor unit. That is to say, the input end W of the standby power supply 30 and the power input end L are connected to the same AC power source, so as to convert the connected strong AC power into weak DC power, supply power to the first electronic switch 20, and drive the first electronic switch 20 to operate. In other embodiments, it can also be connected to other power supplies in the indoor unit, such as 24V, 36V and other power output ends, which are not limited herein. In this embodiment, the non-isolated switching power supply is used to supply power to the first electronic switch 20. Compared with an isolated power supply such as a transformer, this embodiment can reduce the electromagnetic interference generated by the isolated power supply itself on the first electronic switch 20, which is beneficial to improve the reliability of the control of the first electronic switch 20. Moreover, since the non-isolated switching power supply does not need to install transformers and other components with serious heat generation, its own power consumption is low, and there is no need to install a cooling device for the switching power supply.

As shown in FIG. 1 to FIG. 3, in an embodiment, the control circuit for the air conditioner outdoor unit further includes:

a second electronic switch 40 provided in series between the power input ends L and N and the input end of the outdoor unit power supply circuit 10; and a current-limiting element PTC1 provided in series between the first electronic switch 20 and the power input ends L and N of the outdoor unit power supply circuit 10.

In an embodiment, the control circuit for the air conditioner outdoor unit further includes an outdoor unit main controller.

A control signal input end of the outdoor unit main controller is in communication with an indoor unit main controller, an output end of the outdoor unit main controller is connected to a controlled end of the second electronic switch 40, and the outdoor unit main controller is configured to control the closing of the second electronic switch 40 when receiving a power-on control signal.

The current-limiting element PTC1 can be implemented by elements with current-limiting characteristics such as inductors and resistors, and resistors can be used in this embodiment.

In this embodiment, when the air conditioner is powered on, the outdoor unit power supply circuit 10 converts the AC power connected through the AC input end and the current-limiting element PTC1 into DC power and outputs it to the power supply end of the outdoor unit main controller to supply power for the outdoor unit main controller. At this time, the current-limiting element PTC1 can suppress the current surge at the moment of power-on, so as to prevent the excessive current impact from damaging the downstream circuit such as the rectifier bridge B1, the PFC circuit or other power supply. The outdoor unit main controller is also integrated with a counter, and by adjusting the timing of the counter, after the air conditioner is powered on for a certain period of time, such as 10 s or 20 s, the outdoor unit main controller controls the closing of the second electronic switch 40, so as to control the power input ends L and N to access to the AC power supply, and supply power to other circuit modules of the outdoor unit.

The second electronic switch 40 can be realized by using a relay, a contactor or a circuit breaker, and this embodiment can be realized by using a relay. It can be understood that when the outdoor unit controller is realized by a microcontroller such as a single chip microcomputer, the second electronic switch 40 is realized by a relay (marked as the second relay RY2 in the figure), the operating voltage of the outdoor unit controller is generally 3.3V or 5V, and the driving voltage of the relay is generally 12V. In order to drive the relay to operate, a relay driving circuit, such as a triode circuit, may also be provided on the main control board. The relay driving circuit is arranged in series between the outdoor unit controller and the relay, so that the outdoor unit controller controls the relay driving circuit to drive the relay to act. In this embodiment, when the second electronic switch 40 is implemented by a relay, that is, when the second electronic switch 40 is implemented by the second relay RY2, the controlled end of the second electronic switch 40 is one end of the coil of the second relay RY2 (marked as M1 in the figure), and one end M1 of the coil of the second relay RY2 is connected to the outdoor unit controller through a relay driving circuit (not shown in the figure). The other end of the coil of the second relay RY2 is accessed to the DC power supply VCC1, and the second relay RY2 is closed/disconnected when receiving the control signal of the outdoor unit controller, such that when the second relay RY2 is closed, the power input ends L and N are controlled to output AC power to the outdoor unit power supply circuit 10, or when the second relay RY2 is closed, the power supply to the outdoor unit is stopped.

It can be understood that when the air conditioner outdoor unit is operating normally, such as cooling, heating, defrosting, disinfection, electric purification, etc., the outdoor unit power supply circuit 10 can be powered by the second electronic switch 40 (main relay) on the electric control board of the original outdoor unit. This embodiment adopts dual electronic switches (double relays RY1, RY2), the second electronic switch 40 realizes the power supply when the outdoor unit is in normal operation, and the second electronic switch 40 realizes the power supply when the outdoor unit wakes up from standby. The present disclosure solves the following problems: during the standby process of the air conditioner, it is necessary to supply power to the outdoor unit main controller, which makes the power supply circuit of the outdoor unit main controller (for example, the switching power supply) still in the charged operating state, causing the air conditioner to fail to meet the low energy consumption requirements due to its high standby power. The present disclosure can also solve the following problems: the power supply of the air conditioner is provided by the outdoor unit, and when the whole unit is in the standby state, the load in the outdoor unit is still in the charged operating state, causing that the air conditioner cannot meet the low energy consumption requirements due to its high standby power.

As shown in FIG. 1 to FIG. 3, in an embodiment, the outdoor unit power supply circuit 10 includes a rectifier bridge circuit B2, a power factor correction (PFC) circuit 11 and an intelligent power module (IPM) 12 sequentially connected to the power supply input ends L and N. The controlled ends of the PFC circuit and the IPM module are respectively connected with the main controller.

In this embodiment, the outdoor unit power supply circuit 10 also includes a rectifier bridge B2 for converting the input AC power into DC power for output. The PFC circuit can use PFC switches, diodes, energy storage capacitors, inductors and other components to implement power factor correction for the DC power supply. In this embodiment, multiple power switch tubes are integrated in the IPM module. Multiple power switch tubes form a driving inverter bridge circuit, for example, six power switch tubes can form a three-phase inverter bridge circuit, or four power switch tubes can form a two-phase inverter bridge circuit. Each power switch tube can be realized by using a MOS tube or an IGBT. Multiple power switch tubes form a power inverter bridge circuit, and the PFC circuit and IPM module are respectively connected to the outdoor unit controller, such that when the PFC circuit receives the control signal output by the outdoor unit controller, it corrects the power factor of the input power and outputs it to the IPM module. When the IPM module receives the logic control signal output by the outdoor unit controller, it drives the compressor to operate and realizes the frequency conversion control of the compressor.

As shown in FIG. 1 to FIG. 3, in an embodiment, the control circuit for the air conditioner outdoor unit has a first application mode and a second application mode.

In the first application mode, the first electronic switch 20 is electrically connected to the current-limiting element PTC1.

In the second application mode, the control circuit for an air conditioner outdoor unit further includes short circuit devices J1 and J2. The short circuit devices J1 and J2 are electrically connected to the current-limiting element PTC1.

In this embodiment, two 0 ohm resistors J1 and J2 are simultaneously added and in parallel on the two contacts of the relay and then in series with the current-limiting element PTC1. The low-power standby function of the outdoor unit is fully controlled by hardware, and the standby and normal operation are controlled by relays RY2 and RY1, which can realize low-power standby. In applications without low power consumption standby requirements, it is necessary to input AC power through the strong current terminals L and N to supply power for the air conditioner outdoor unit system. In applications with low power consumption standby requirements, that is, in the first application mode, the system is powered by 3 strong power inserts L, N, and W. In applications without low power consumption standby requirements, that is, in the second application mode, the two welding points of the static contact and the moving contact on the electric control board can be short circuited by the short circuiting devices J1 and J2 through a 0-ohm resistor. At this time, the current-limiting element PTC1 is electrically connected to the power supply input end L through the short circuit devices J1 and J2. With such settings, corresponding functions can be realized according to actual application requirements. It is beneficial to improve the compatibility of the electric control board, can be widely used in the electric control of different models, and can reduce the development cost and production cost of the electric control board. In applications with low power consumption standby requirements, when standby is required, the indoor unit does not output control signals, the relay is not actuated, the W port of the outdoor unit is not powered on, the standby power supply 30 does not output a stable 12V, the relay is not actuated, the outdoor unit is not powered on and is in a low power consumption state. When the indoor unit is in the sweeping state, the indoor unit does not output control signals, the relay is not actuated, the W port of the outdoor unit is not powered on, and the W and N ports do not input AC power to the standby power supply 30, the standby power supply 30 does not output 12V, and then the first relay RY1 is not actuated, the power supply circuit of the outdoor unit is not powered on, and the outdoor unit is in a standby state of 0 power consumption. When normal operation is required, the relay pulls in, W is powered on, and the input end of the standby power supply 30 is powered on. Through the bridge stack rectification and switching power supply control in the standby power supply 30, the stable direct current 12V is output. Further, the standby power supply 30 is controlled to energize and close the first relay RY1, so that the outdoor unit power supply circuit 10 is energized, thereby driving the outdoor unit to operate normally. The input terminals of the independent standby power supply 30 are W and N. The W terminal is powered by the control of the internal machine, and is rectified into DC through the fuse and NTC through the bridge stack, and then the above-mentioned non-isolated switching power supply outputs a stable DC 12V. In order to ensure stable output, two resistor dummy loads can also be added at both ends of the coil of the relay. The standby power supply 30 provides a 12V power supply DJ12 and an independent ground DJ-GND for the execution relay RY1. The low-power standby execution structure is the first relay RY1, is placed at the rear end of the fuse FUSE1 of the main strong current input part of the external machine, and is located in front of the bridge stack, connected in series with the current-limiting element PTC1, and then connected in parallel with the second relay RY2, that is, the second electronic switch 40. In applications with low power consumption standby requirements, the power supply ports of the main strong current input circuit of the outdoor unit are L and N, the input ports of the standby power supply 30 are W and N. When the outdoor unit needs to be woken up from the standby state, the standby power supply 30 is accessed to the power supply, and the first relay RY1 is powered on and pulled in, so that the outdoor unit power supply circuit 10 is powered on, thereby driving the outdoor unit to operate normally.

The present disclosure further provides an electric control component, including an electric control board of an indoor unit, an electric control board of an outdoor unit, an electrical connector, and the above-mentioned control circuit for an air conditioner outdoor unit.

The control circuit for the air conditioner outdoor unit and the electrical connector are provided on the electric control board of the outdoor unit;

The electrical connector is configured for connecting the electric control board of the indoor unit and the electric control board of the outdoor unit.

In this embodiment, the electrical connector can be a power terminal, and the detachable electrical connection between the electrical control board of the indoor unit and the electrical control board of the outdoor unit is realized through the power terminal and the power cord. All the components of the control circuit for the air conditioner outdoor unit are provided on the electric control board of the outdoor unit, so that all the low-power standby functions can be arranged on the control PCB without relying on the AC contactor. The on-off of the first electronic switch 20 is controlled by the standby power supply 30, so as to realize zero power consumption standby and wake-up.

In the present disclosure, in applications without low power consumption standby requirements, the power supply ports of the main strong current input circuit of the outdoor unit are L and N, and there is no need to set the first relay RY1 and the standby power supply 30. Compared with that the low-power standby function of the air conditioner outdoor unit uses the AC contactor to switch off to achieve standby, since the AC contactor needs to be assembled separately, the assembly is complicated, and the external radiation is large, which increases the difficulty of electromagnetic compatibility. The present disclosure uses the relay and the standby power supply 30 to achieve low-power standby. The relay and the standby power supply 30 are provided on the electric control board of the outdoor unit. The standby power supply 30 is independent from the ground DJ-GND of the executive relay RY1, and is not shared with the ground PGND of the outdoor unit main circuit, which can effectively reduce the electromagnetic interference generated by the relay from affecting other circuits on the electric control board, and is conducive to improving the reliability of the outdoor unit.

As shown in FIG. 1 to FIG. 3, in an embodiment, the electric control board of the indoor unit is provided with an indoor unit main controller (not shown).

The indoor unit main controller is in communication with the main controller of the control circuit for the air conditioner outdoor unit.

The indoor unit main controller is configured to communicate with an outdoor unit main controller of the control circuit for the air conditioner outdoor unit in response to receiving a power-on control signal to control the closing of the second electronic switch 40 of the control circuit for the air conditioner outdoor unit; and output the standby control power supply to the standby power supply of the control circuit for the air conditioner outdoor unit in response to receiving a wake-up control signal to control the closing of the first electronic switch 20 of the control circuit for the air conditioner outdoor unit.

The indoor unit controller and the outdoor unit controller can be microprocessors such as single-chip microcomputers, DSPs and FPGAs. Those skilled in the art can realize the communication between the indoor unit controller and the outdoor unit controller by integrating some hardware circuits and software programs or algorithms. The indoor unit controller and the outdoor unit controller may also be integrated with software algorithm programs for analyzing and comparing received control instruction numbers, as well as decoders and other algorithm programs for analyzing control instructions. By running or executing the software programs and/or modules stored in the memory of the main controller, and calling the data stored in the memory, the received control instructions are compared, analyzed and processed. For example, when the controller of the outdoor unit receives a power-on instruction, the controller of the outdoor unit outputs a switch control signal to the second electronic switch 40, to trigger the closing of the second electronic switch 40, so as to supply power to the outdoor unit power supply circuit 10. Or when the outdoor unit controller receives the shutdown instruction, the outdoor unit controller outputs a switch control signal to the second electronic switch 40, to trigger the second electronic switch 40 to be turned off, so as to stop supplying power to the outdoor unit power supply circuit 10.

It can be understood that the electric control board of the indoor unit is also provided with a current detection circuit, a voltage detection circuit, and a signal detection circuit such as a temperature detection circuit at the corresponding position of each structural component of the air conditioner. The indoor unit controller can also receive indoor signals, such as indoor temperature, heat exchanger temperature, compressor temperature, fan speed, compressor current, or the like, and control the outdoor unit power supply circuit 10 to operate through the outdoor unit controller according to the indoor signal.

The outdoor unit power supply circuit 10 operates according to the logic instruction output by the outdoor unit controller, and converts the connected AC power through the PFC circuit and IPM module to drive compressors, fans, heat exchangers and other components to operate.

When the air conditioner is powered on, the power supply in the outdoor unit power supply circuit 10 is converted to DC by the AC input accessed to the AC input end, and then output to the power supply end of the outdoor unit controller to provide power for the outdoor unit controller. At this time, the current-limiting element PTC1 can suppress the current surge at the moment of power-on, so as to prevent the current impact from being too large and damage the downstream circuit such as the outdoor unit power supply circuit 10. The outdoor unit controller is also integrated with a counter, and by adjusting the timing of the counter, after the air conditioner is powered on for a certain period of time, such as 10 s or 20 s, the outdoor unit controller controls the closing of the second electronic switch 40. In this way, the control power input ends L and N are accessed to the AC power supply, and supply power to other circuit modules on the electric control board of the outdoor unit.

The outdoor unit controller is in communication with the indoor unit controller. Besides, the indoor unit controller can receive external control instructions, for example remote control instructions, such as cooling, heating, dehumidification, temperature, and air speed, can decode and analyze the received control instructions, convert them into corresponding control signals, and output them to the indoor unit controller and the outdoor unit controller, such that the outdoor unit controller drives the outdoor unit power supply circuit 10 and other circuit modules and loads on the outdoor unit electric control board to operate according to the received control signal, so as to realize the cooling, heating, dehumidification and other functions of the air conditioner. The outdoor unit power supply circuit 10 converts the input electric energy into a power supply voltage and then outputs it to compressors, fans, heat exchangers and other components to drive the compressors, fans, heat exchangers and other components to operate.

The present disclosure further provides an air conditioner. The air conditioner includes the control circuit for the air conditioner outdoor unit as described above. For the detailed structure of the control circuit for the air conditioner outdoor unit, reference may be made to the above-mentioned embodiments, which will not be repeated herein. It can be understood that, due to the use of the above-mentioned control circuit for the air conditioner outdoor unit in the air conditioner of the present disclosure, the embodiments of the air conditioner of the present disclosure include all the technical solutions of all the embodiments of the control circuit for the air conditioner outdoor unit described above, and the achieved technical effects are also completely the same, which will not be repeated herein.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A control circuit for an air conditioner outdoor unit, comprising:
    a power input end for accessing alternating current (AC) power;
    an outdoor unit power supply circuit connected to the power input end, and for converting the accessed AC power into an outdoor unit power supply;
    a first electronic switch provided in series between the power input end and the outdoor unit power supply circuit; and
    a standby power supply, wherein an input end of the standby power supply is connected to an output end of a standby control power supply of an indoor unit, an output end of the standby power supply is connected to a controlled end of the first electronic switch, and the standby power supply is configured to:
        receive the standby control power supply from the indoor unit; and
        control the first electronic switch by using the standby control power supply to close the first electronic switch to enable the outdoor unit power supply circuit to convert the accessed AC power into the outdoor unit power supply to supply power to the air conditioner outdoor unit.

2. The control circuit for the air conditioner outdoor unit according to claim 1, wherein:
    the first electronic switch is a first relay,
    a first end of a first relay coil is connected to a ground end of the standby power supply,
    a second end of the first relay coil is the controlled end of the first electronic switch,
    a static contact of the first relay is connected to the power input end, and
    a movable contact of the first relay is connected to an input end of the outdoor unit power supply circuit.

3. The control circuit for the air conditioner outdoor unit according to claim 2, wherein:
    the standby power supply comprises a non-isolated switching power supply,
    an input end of the non-isolated switching power supply is an input end of the standby power supply,
    an output end of the non-isolated switching power supply is an output end of the standby power supply, and
    the non-isolated switching power supply is configured to convert the standby control power supply of the indoor unit into direct current (DC) voltage, to power on and actuate the first relay.

4. The control circuit for the air conditioner outdoor unit according to claim 1, further comprising:
    a second electronic switch provided in series between the power input end and the input end of the outdoor unit power supply circuit; and
    a current-limiting element provided in series between the first electronic switch and the power input end of the outdoor unit power supply circuit.

5. The control circuit for the air conditioner outdoor unit according to claim 4, further comprising:
    an outdoor unit main controller,
    wherein a control signal input end of the outdoor unit main controller is in communication with an indoor unit main controller, an output end of the outdoor unit main controller is connected to a controlled end of the second electronic switch, and the outdoor unit main controller is configured to control closing of the second electronic switch when receiving a power-on control signal.

6. The control circuit for the air conditioner outdoor unit according to claim 5, wherein:
    the outdoor unit power supply circuit comprises a rectifier bridge circuit, a power factor correction (PFC) circuit and an intelligent power module (IPM) sequentially connected to the power input end, and
    a controlled end of the PFC circuit and a controlled end of the IPM module are respectively connected to the outdoor unit main controller.

7. The control circuit for the air conditioner outdoor unit according to claim 4, wherein:
    the control circuit for the air conditioner outdoor unit has a first application mode and a second application mode;
    in the first application mode, the first electronic switch is electrically connected to the current-limiting element; and
    in the second application mode, the control circuit for the air conditioner outdoor unit further comprises a short circuit device electrically connected to the current-limiting element.

8. An electric control component comprising:
    an electric control board of an indoor unit;
    an electric control board of an outdoor unit;
    an electrical connector; and
    the control circuit for the air conditioner outdoor unit according to claim 1,
    wherein the control circuit for the air conditioner outdoor unit and the electrical connector are provided on the electric control board of the outdoor unit, and the electrical connector is configured to connect the electric control board of the indoor unit to the electric control board of the outdoor unit.

9. The electric control component according to claim 8, wherein:
- the electric control board of the indoor unit is provided with an indoor unit main controller;
- the indoor unit main controller is in communication with a main controller of the control circuit for the air conditioner outdoor unit;
- the indoor unit main controller is configured to communicate with an outdoor unit main controller of the control circuit for the air conditioner outdoor unit in response to receiving a power-on control signal to control closing of a second electronic switch of the control circuit for the air conditioner outdoor unit; and
- the indoor unit main controller is further configured to output the standby control power supply to the standby power supply of the control circuit for the air conditioner outdoor unit in response to receiving a wake-up control signal to control the closing of the first electronic switch of the control circuit for the air conditioner outdoor unit.

10. An air conditioner comprising the control circuit for the air conditioner outdoor unit according to claim 1.

11. An air conditioner comprising the electric control component according to claim 8.

* * * * *